US010452488B1

(12) United States Patent
Bull et al.

(10) Patent No.: US 10,452,488 B1
(45) Date of Patent: Oct. 22, 2019

(54) SYSTEMS AND METHODS FOR EFFICIENT ARCHIVING OF RELATED ELECTRONIC MESSAGES

(71) Applicant: Veritas Technologies LLC, Mountain View, CA (US)

(72) Inventors: Steven Bull, Reading (GB); Andrew Gilbert, Reading (GB)

(73) Assignee: Veritas Technologies LLC, Santa Clara, CA (US)

( * ) Notice: Subject to any disclaimer, the term of this patent is extended or adjusted under 35 U.S.C. 154(b) by 182 days.

(21) Appl. No.: 15/594,554

(22) Filed: May 12, 2017

(51) Int. Cl.
*G06F 16/00* (2019.01)
*G06F 11/14* (2006.01)

(52) U.S. Cl.
CPC ...... *G06F 11/1451* (2013.01); *G06F 2201/87* (2013.01)

(58) Field of Classification Search
CPC ..................................................... G06F 16/185
USPC .......................................... 707/647; 709/206
See application file for complete search history.

(56) References Cited

U.S. PATENT DOCUMENTS

| 7,836,139 B1* | 11/2010 | Gilbert | H04L 51/22 709/206 |
| 7,917,592 B1 | 3/2011 | Gilbert et al. | |
| 2007/0038714 A1* | 2/2007 | Sell | H04L 51/34 709/206 |
| 2011/0196934 A1* | 8/2011 | Sheer | H04L 67/1002 709/206 |

* cited by examiner

*Primary Examiner* — Chelcie L Daye
(74) *Attorney, Agent, or Firm* — FisherBroyles, LLP

(57) ABSTRACT

The disclosed computer-implemented method for efficient archiving of related electronic messages may include (1) receiving, at a message archiving system, a corpus of electronic messages from one or more servers, where at least a portion of the electronic messages in the corpus represents electronic messages that are related to each other, (2) processing the corpus of electronic messages into groups of related electronic messages, where each group of the related electronic messages is associated with a message identifier, and (3) archiving, by the message archiving system, each group of related electronic messages as a corresponding unified archive item. Various other methods, systems, and computer-readable media are also disclosed.

20 Claims, 4 Drawing Sheets

SYSTEMS AND METHODS FOR EFFICIENT ARCHIVING OF RELATED ELECTRONIC MESSAGES

BACKGROUND

Electronic mail servers may often send journal reports (e.g., an email detailing the recipients of an original message, with the original message included as an attachment) to an archive server for archiving and later review during legal or regulatory compliance tasks. For example, an email server may forward an email from a user to multiple recipients. The email server may then generate multiple journal reports for the related email messages and forward the journal reports to an archiving system. Unfortunately, the receipt of multiple journal reports poses a storage problem for conventional archiving systems as multiple items for the same email must be stored, thereby requiring a large storage footprint. Moreover, workload and costs associated with legal or regulatory archive searches are increased, making it difficult to complete compliance tasks. The instant disclosure, therefore, identifies and addresses a need for systems and methods for efficient archiving of related electronic messages.

SUMMARY

As will be described in greater detail below, the instant disclosure describes various systems and methods for efficient archiving of related electronic messages by grouping related electronic messages into a single item for archiving. By grouping the related electronic messages into a single archive item, the systems and methods described herein may reduce a storage footprint associated with the archiving of electronic messages.

In one embodiment, a method for efficient archiving of related electronic messages may include (1) receiving, at a message archiving system, a corpus of electronic messages from one or more servers, where at least a portion of the electronic messages in the corpus represents electronic messages that are related to each other, (2) processing the corpus of electronic messages into groups of related electronic messages, where each group of the related electronic messages is associated with a message identifier, and (3) archiving, by the message archiving system, each group of related electronic messages as a corresponding unified archive item. The archiving system may include a Simple Mail Transfer Protocol (SMTP) mail archiving system.

In some examples, receiving the corpus of electronic messages may include (1) receiving the corpus of electronic messages in a load balancer of the archiving system and (2) presorting the corpus of electronic messages to ensure that each group of the related electronic messages is sent to a designated archive server in the message archiving system.

In some examples, presorting the corpus of electronic messages may include (1) determining that a message identifier for an electronic message in the corpus already exists in a load balancer storage, (2) identifying a designated archive server associated with the message identifier in the load balancer storage, (3) updating a storage entry associated with the message identifier in the load balancer storage with a timestamp, and (4) sending the electronic message to the designated archive server. Additionally, or alternatively, presorting the corpus of electronic messages may include (1) determining that a message identifier for an electronic message in the corpus does not exist in a load balancer storage, (2) selecting an archive server in the message archiving system, (3) creating a storage entry in the load balancer storage for the electronic message, with the storage entry including the message identifier, the selected archive server, and a timestamp, and (4) sending the electronic message to the selected archive server. Additionally or alternatively, presorting the corpus of electronic messages may further include: (1) determining that a message identifier does not exist for an electronic message in the corpus, (2) selecting, by the load balancer, an archive server, and (3) sending the electronic message to the selected archive server.

In some examples, processing the corpus of electronic messages into groups of related electronic messages may include (1) identifying the electronic messages in the corpus as journal parts based on the message identifier, (2) designating the journal parts for grouping, and (3) grouping the journal parts for archiving after a configurable time period has elapsed.

In some examples, archiving each group of related electronic messages as a corresponding unified archive item may include (1) receiving a set of grouped journal parts corresponding to a group of the related electronic messages and (2) archiving the grouped journal parts as the unified archive item. In one embodiment, the grouped journal parts may be a journal report.

In one example, a system for efficient archiving of related electronic messages may include several modules stored in memory, including (1) a reception module that receives a corpus of electronic messages from one or more servers, where at least a portion of the electronic messages in the corpus represents electronic messages that are related to each other, (2) a processing module that processes the corpus of electronic messages into groups of related electronic messages, where each group of the related electronic messages is associated with a message identifier, and (3) an archiving module that archives each group of related electronic messages as a corresponding unified archive item.

In some examples, the above-described method may be encoded as computer-readable instructions on a non-transitory computer-readable medium. For example, a computer-readable medium may include one or more computer-executable instructions that, when executed by at least one physical processor of a computing device, may cause the computing device to (1) receive a corpus of electronic messages from one or more servers, where at least a portion of the electronic messages in the corpus represents electronic messages that are related to each other, (2) process the corpus of electronic messages into groups of related electronic messages, where each group of the related electronic messages is associated with a message identifier, and (3) archive each group of related electronic messages as a corresponding unified archive item.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
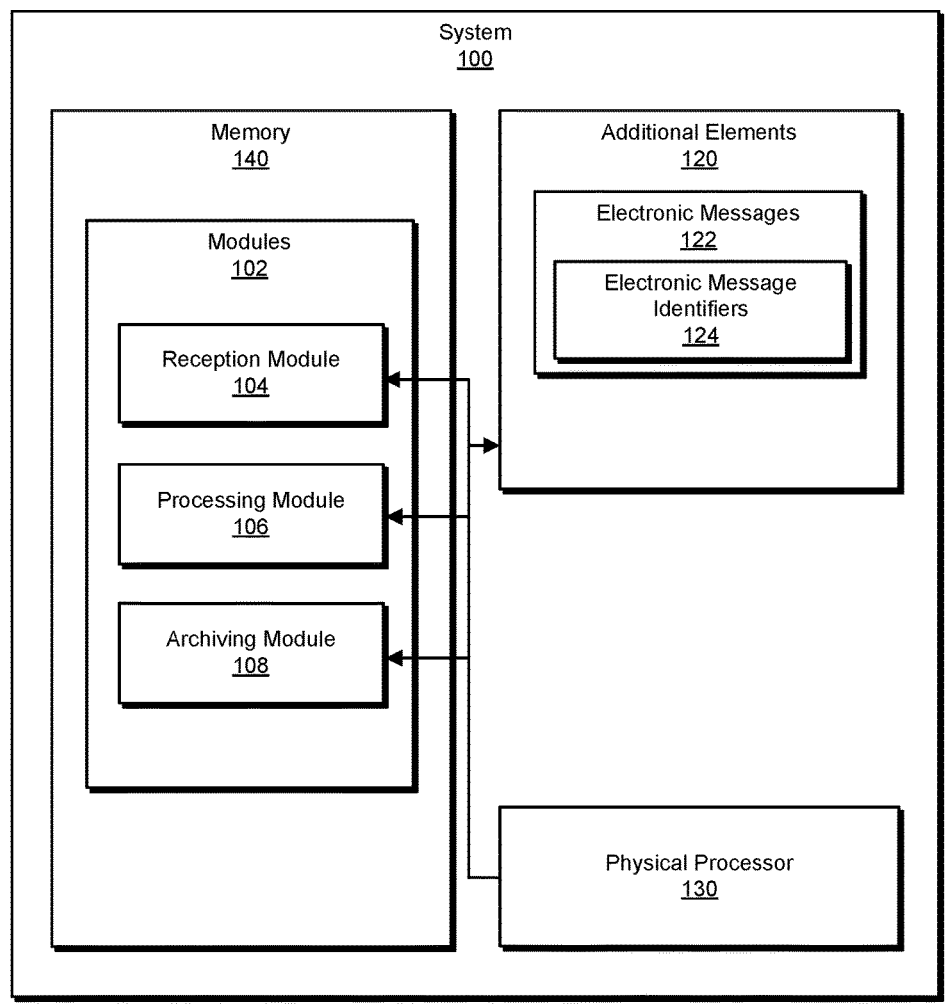
FIG. 1 is a block diagram of an example system for efficient archiving of related electronic messages.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for efficient archiving of related electronic messages. As will be described in greater detail below, after receiving, at a message archiving system, a corpus of electronic messages from one or more servers, the various systems and methods described herein may be able to process the corpus of electronic messages into groups of related electronic messages with each group being associated with a message identifier. Upon processing the corpus of electronic messages, the various systems and methods described herein may archive, by the message archiving system, each group of related electronic messages as a corresponding unified archive item. As such, the systems and methods described herein may ensure that all relevant data related to email (e.g., a recipient list) is stored together as a single archive item instead of multiple archive items. Moreover, the systems and methods described herein may improve the functioning and/or performance of a server by reducing a storage footprint associated with archiving.

Figure 2:
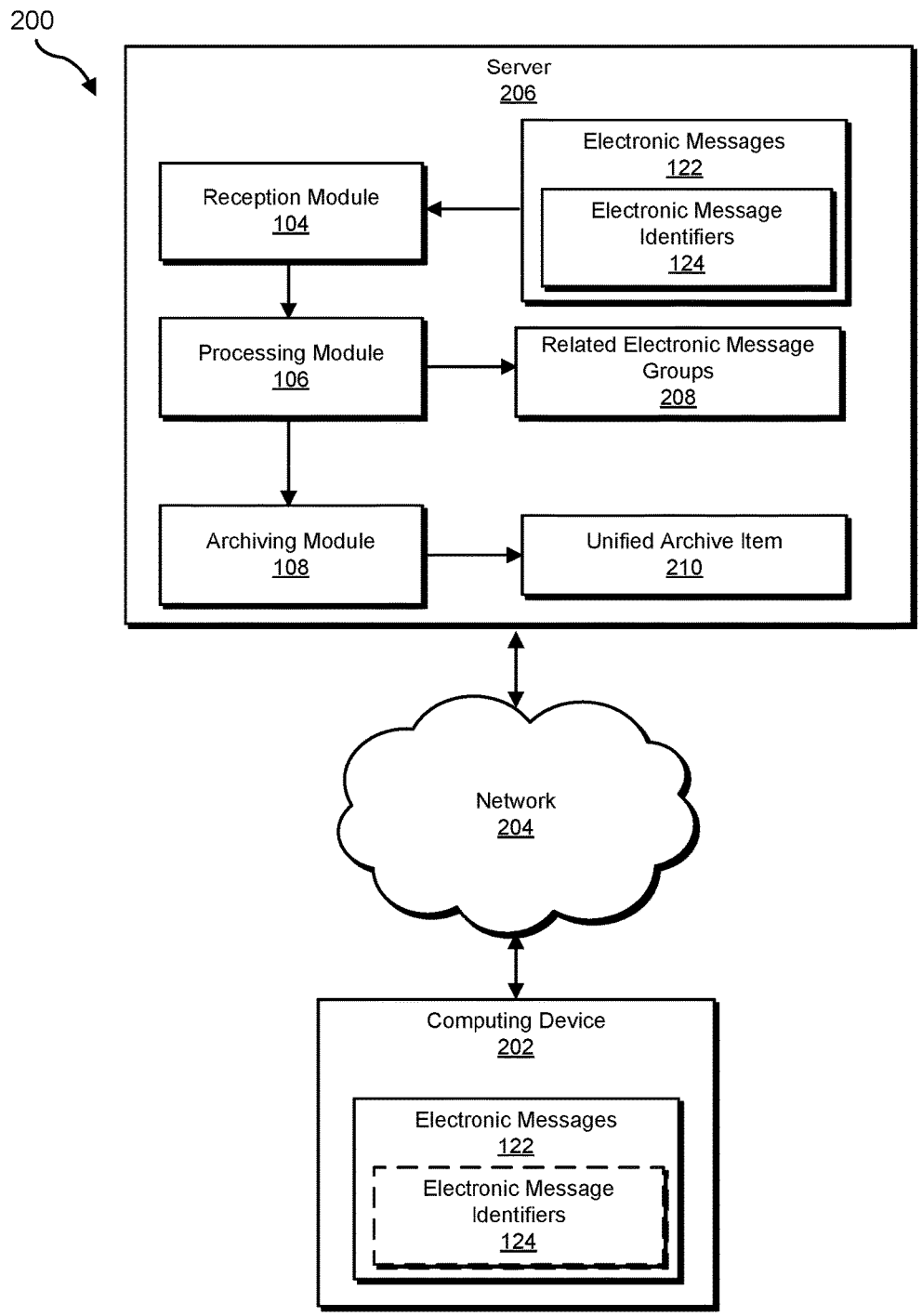
FIG. 2 is a block diagram of an additional example system for efficient archiving of related electronic messages.

The following will provide, with reference to FIGS. 1-2, detailed descriptions of example systems for efficient archiving of related electronic messages. Detailed descriptions of corresponding computer-implemented methods will also be provided in connection with FIG. 3. In addition, detailed descriptions of additional example systems for efficient archiving of related electronic messages will also be provided in connection with FIG. 4.

FIG. 1 is a block diagram of an example system 100 for efficient archiving of related electronic messages. As illustrated in this figure, example system 100 may include one or more modules 102 for performing one or more tasks. As will be explained in greater detail below, modules 102 may include a reception module 104 that receives a corpus of electronic messages. As will be explained in greater detail below, example system 100 may also include a processing module 106 that processes the corpus of electronic messages into groups of related electronic messages. Example system 100 may also include an archiving module 108 that archives respective groups of related electronic messages as corresponding unified archive items. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate efficient archiving of related electronic messages. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120. In one example, additional elements 120 may include electronic messages 122, which may further include one or more electronic message identifiers 124. In some examples, electronic messages 122 may include one or more journal parts representing ungrouped journal reports. The term "journal reports," as used herein, generally refers to any email message that details the recipients of an original email message, where the original email message is included as an attachment. Electronic message identifiers 124 may represent a unique identifier for the original email message. In some embodiments, journal reports may represent emails sent/received for compliance, discovery, regulatory, or other purposes. The term "journal parts," as used herein, generally refers to an ungrouped journal report.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one physical processor of computing device 202 and/or server 206, enable computing device 202 and/or server 206 to efficiently archive related electronic messages.

For example, reception module 104 may cause server 206 to receive electronic messages 122 (which may include electronic message identifiers 124). Processing module 106 may then cause server 206 to process electronic messages 122 into groups of related electronic messages, where each group is associated with an electronic message identifier 124. Next, archiving module 108 may cause server 206 to archive each group of related electronic messages as a corresponding unified archive item 210.

Computing device 202 generally represents any type or form of computing device capable of reading computer-executable instructions. In one example, computing device 202 may represent a mail server for receiving journal reports to send to server 206 for archiving. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of an application used to receive, process, and/or archive groups of related electronic messages. In one example, server 206 may represent an archive server that performs data storage, data management, and data discovery services associated with journal reports and/or other electronic messages. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
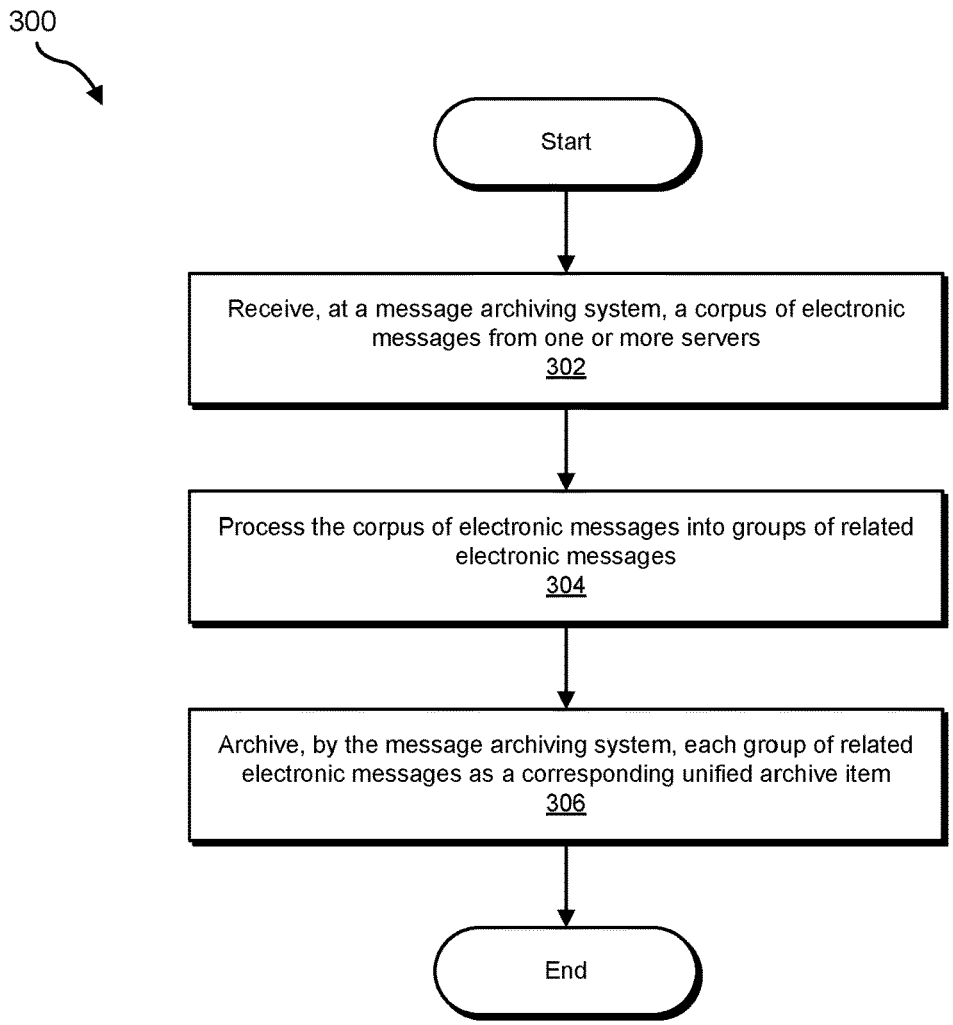
FIG. 3 is a flow diagram of an example method for efficient archiving of related electronic messages.

FIG. 3 is a flow diagram of an example computer-implemented method 300 for efficient archiving of related electronic messages. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a corpus of electronic messages from one or more servers, where at least a portion of the electronic messages in the corpus represent electronic messages that are related to each other. For example, reception module 104 may, as part of server 206 in FIG. 2, receive electronic messages 122 (which may include electronic message identifiers 124) from computing device 202. As an example, the disclosed systems may operate as part of an email archiving system for journal reports used in compliance or electronic discovery workflows. In this example, reception module 104 may receive journal parts from a mail server. As one example, the email archiving system may represent a Simple Mail Transfer Protocol (SMTP) mail archiving system.

Reception module 104 may receive electronic messages 122 from computing device 202 in a variety of ways. For example, reception module 104 may receive electronic messages 122 directly from a single mail server. As another example, reception module 104 may receive electronic messages from a load balancer. The load balancer may receive electronic messages from multiple mail servers and direct the electronic messages to a designated archive server hosting reception module 104.

Figure 4:
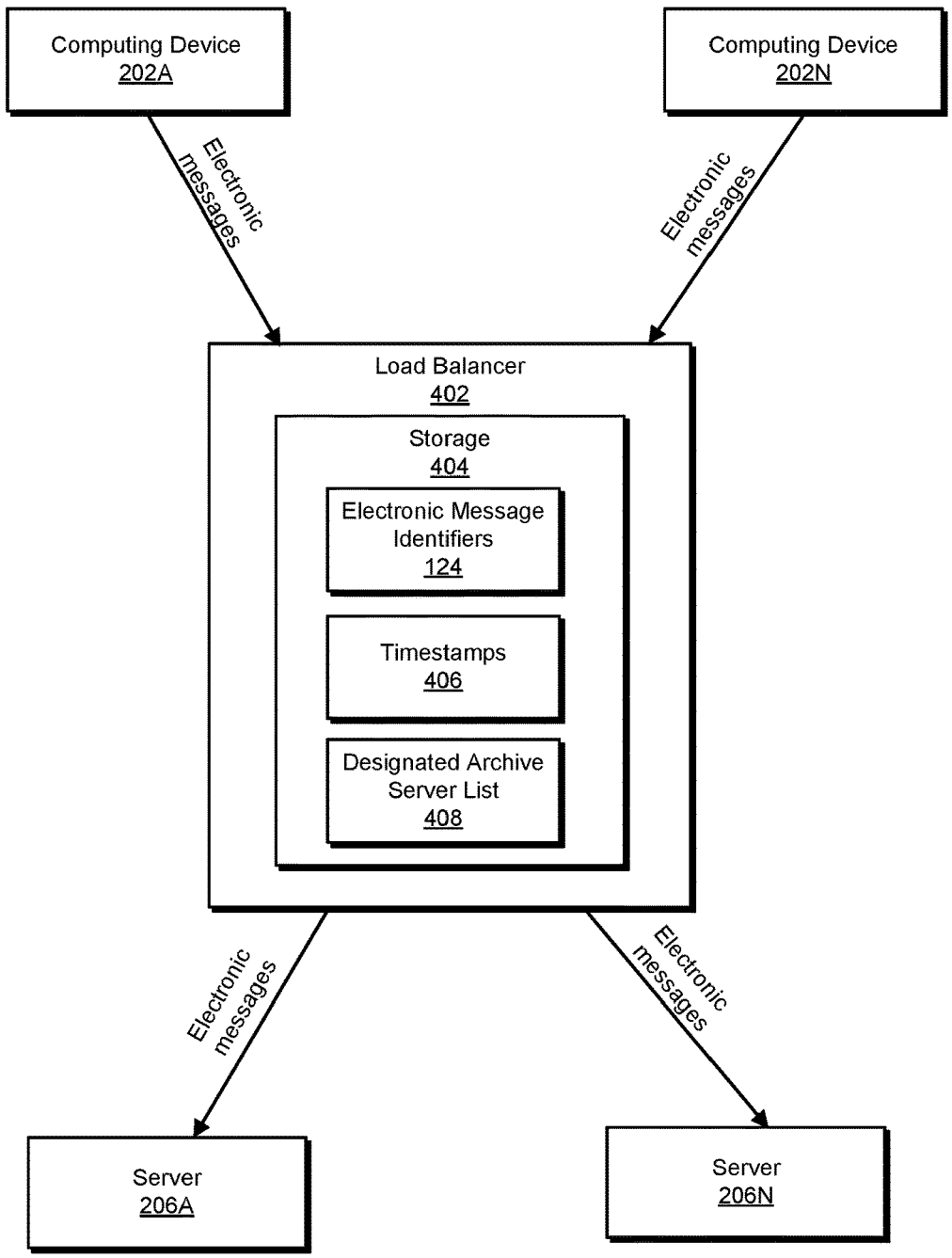
FIG. 4 is a block diagram of an additional example system for efficient archiving of related electronic messages.

FIG. 4 illustrates an example of such a load balancer. In this example, load balancer 402, after receiving a corpus of electronic messages 122 from computing devices 202A-202N, may presort the corpus of electronic messages to ensure that each group of the related electronic messages is sent to a designated archive server 206A-206N. In presorting electronic messages 122, load balancer 402 may, in one example, determine that an electronic message identifier 124 already exists in storage 404, identify a designated archive server from designated archive server list 408 (e.g., one of servers 206A-206N) associated with an electronic message identifier 124, update a storage entry associated with the electronic message identifier 124 with a timestamp 406, and send a corresponding electronic message to the designated archive server. In another example, load balancer 402 may determine that an electronic message identifier 124 for an electronic message 122 does not exist in storage 404, select an archive server from the designated archive server list 408, create a storage entry in the storage 404 for an electronic message 122 (the storage entry may represent a received electronic message identifier 124, the selected archive server, and a timestamp 406), and send electronic message 122 to the selected archive server (e.g., one of the servers 206A-206N). In another example, load balancer 402 may determine that an electronic message identifier 124 does not exist for an electronic message 122, select an archive server from the designated archive server list 408, and send electronic message 122 to the selected archive server (e.g., one of the servers 206A-206N).

In some embodiments, storage 404 may represent a cache storage. In an alternative embodiment, storage 404 may represent a database storage. In another alternative embodiment, a hash function may be utilized instead of the storage 404 (e.g., a cache storage). In one example, the hash function may be utilized on an electronic message identifier to produce an integer. A modular function ("mod") may then be applied to the integer and a total number of archive servers, with the result being mapped to one of the archive servers (e.g., "1" may be mapped to archive server 01, "2" may be mapped to archive server 02, etc.).

Timestamp 406, in some embodiments, may be used to expire entries from storage 404 once a configurable timespan has elapsed, indicating that no more related electronic messages parts are expected for an electronic message identifier 124. The storage entries may be checked periodically and the entries with a sufficiently old timestamp may be removed from storage 404.

Returning to FIG. 3, at step 304 one or more of the systems described herein may process a corpus of the electronic messages (received at step 302) into groups of related electronic messages, where each group of related electronic messages is associated with a message identifier. For example, processing module 106 may, as part of server 206 in FIG. 2, process electronic messages 122 (which may include electronic message identifiers 124) received from reception module 104. As an example, processing module 106 may identify electronic messages 122 as journal parts based on an electronic message identifier 124, designate the journal parts for grouping, and group the journal parts for archiving after a configurable time period (e.g., a number of minutes) has elapsed.

In some embodiments, the disclosed systems may process electronic messages by identifying journal parts and marking them ready for an archiving phase. As one example, an archive server may store email files in a folder structure based on the minute they were received. Alternatively, in this example, metadata for the email files may be stored in a database. When utilizing a folder structure, an archive server may open a folder that contains email files is opened. Each email file in the folder may then be processed. If an email file is not a journal report it may be archived immediately, and the next email file may be processed. If the email file is a journal report, a message identification may be read from the file. If a message identification does not exist for the email file, it may be archived immediately, and the next email file may be processed. In some embodiments, the email file may be renamed to identify it as part of a group of journal reports. For example, the new filename may be in the format <message-id>.<original filename>.part or, alternatively, <message-id>.<current time>.<original filename>.part. In some embodiments, the message identification may be checked against an in-memory cache (or a database) of the archive server.

For each message identification entry, the cache (or database) may store a count of contiguous folders checked without finding a related journal part as well as the path of the folder where the message identification was first encountered. Alternatively, the cache (or database) entry may also contain the path of the folder where the message identification was last encountered or a list of the full paths for each related journal part. When the message identification is found to be already in the cache (or database), its entry may be updated such that the count of contiguous folders is set to zero. If the message identification is not in the cache (or database), then an entry may be added with the count set to zero and a first folder set to the current folder being processed. In some embodiments, a check of the cache (or database) by the archive server may be skipped if a previous email file was for the same message identification as a current email file.

In some embodiments, the disclosed systems may further process electronic messages upon an archive server examining its cache (or database) to determine whether any journal parts are eligible to be archived. As one example, the eligibility check may be performed by iterating through each entry in a cache (or database) of message identifications and checking that a count of contiguous folders that may be seen without encountering a journal part for a message identification is above a configurable threshold. In one example, the threshold may correspond to a number of minutes passed without receiving a related journal part. If the threshold is breached, then the group of related journal parts for the message identification is eligible to be archived and the entry for the message identification may be removed from the cache (or database) once all of the details associated with the journal parts have been retrieved and passed for archiving. If the threshold is not breached, then a cache (or database) entry may be updated by incrementing a count of folders by one. In other words, a journal part for a message identification may be assumed not to be found in a next folder to be processed. However, if a message identification is found to be in the next folder, then the count will be reset to zero when that folder is processed.

Returning to FIG. 3, at step 306 one or more of the systems described herein may archive each group of related electronic messages (processed at step 304) as a corresponding unified archive item. For example, archive module 108 may, as part of server 206 in FIG. 2, archive groups of related electronic messages 122 received from processing module 106. As an example, archive module 108 may receive a set of grouped journal parts corresponding to a group of related electronic messages 122 and archive the grouped journal parts as a unified archive item.

In some embodiments, the disclosed systems may archive groups of related electronic messages upon an archive server receiving inputs including a message identification, with the last processed folder and the path of a first folder containing journal parts for a group of related journal parts.

The last folder containing journal parts for the group is calculated from the last folder processed by a phase associated with identifying journal parts and marking them ready for final archiving and the threshold number in a phase associated with the grouping and archiving of labelled journal parts as a single group (as discussed above). The first folder containing journal parts for the group may then be opened and the full details of the journal parts for an associated message identification may be added to a set of grouped journal parts to be archived. Each subsequent folder may then be opened and the details for journal parts with the same message identification may be added to the set until the last folder for the group has been processed. The set of grouped journal parts may then be passed to an archiving application that will process the set of grouped journal parts and remove them from the folders. As explained above in connection with FIGS. 1-4, an ENTERPRISE VAULT cloud-based or on-premises based archive platform may group journal parts (e.g., ungrouped journal parts) for archiving. For example, an ENTERPRISE VAULT platform may identify journal parts received from a mail server as related email messages directed to a SMTP recipient and mark them as such. Upon receiving the journal parts, the ENTERPRISE VAULT platform may group the journal parts after a configurable period has elapsed. Finally, the ENTERPRISE VAULT platform may archive the grouped journal parts as a single archive item. The ENTERPRISE VAULT platform may also optionally ensure that all related journal parts are sent to a same archive server in configurations where there are multiple archive servers available. This scenario may be used to balance the archiving load across servers and ensure timely archiving of incoming email messages. By grouping related journal parts into a single item at archive time, the ENTERPRISE VAULT platform may ensure that all the relevant data related to an email item (e.g., a recipient list) may be stored together. Accordingly, by having only a single archive item, the ENTERPRISE VAULT platform may reduce the storage footprint of an archive solution. Moreover, the ENTERPRISE VAULT platform may reduce workload and costs associated with compliance or electronic discovery workflows, thereby facilitating meeting legal and regulatory requirements associated with said workflows.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for efficient archiving of related electronic messages, at least a portion of the method being performed by a computing device comprising at least one physical processor, the method comprising:
receiving, at a message archiving system, a corpus of electronic messages from one or more servers, wherein at least a portion of the electronic messages in the corpus represent electronic messages that are related to each other;
processing the corpus of electronic messages into groups of related electronic messages, wherein each group of the related electronic messages is associated with a message identifier and wherein processing the corpus of electronic messages comprises:
identifying the electronic messages in the corpus as journal parts based on the message identifier;
designating the journal parts for grouping;
grouping the journal parts for archiving after a configurable time period has elapsed;
iterating through each of a plurality of entries in a cache of message identifiers to check, in a count of contiguous folders, receipt of a related journal part associated with the message identifiers over a configurable threshold period; and
determining that the grouped journal parts are eligible for archiving when the configurable threshold period has been exceeded without receiving the related journal part; and
archiving, by the message archiving system, each group of related electronic messages as a corresponding unified archive item.

2. The method of claim 1, wherein receiving the corpus of electronic messages comprises:
receiving the corpus of electronic messages in a load balancer of the archiving system; and
presorting the corpus of electronic messages to ensure that each group of the related electronic messages is sent to a designated archive server in the message archiving system.

3. The method of claim 2, wherein presorting the corpus of electronic messages comprises:
determining that a message identifier for an electronic message in the corpus already exists in a load balancer storage;
identifying a designated archive server associated with the message identifier in the load balancer storage;
updating a storage entry associated with the message identifier in the load balancer storage with a timestamp; and
sending the electronic message to the designated archive server.

4. The method of claim 2, wherein presorting the corpus of electronic messages comprises:
determining that a message identifier for an electronic message in the corpus does not exist in a load balancer storage;
selecting an archive server in the message archiving system;
creating a storage entry in the load balancer storage for the electronic message, the storage entry comprising the message identifier, the selected archive server, and a timestamp; and
sending the electronic message to the selected archive server.

5. The method of claim 2, wherein presorting the corpus of electronic messages comprises:
determining that a message identifier does not exist for an electronic message in the corpus;
selecting, by the load balancer, an archive server; and
sending the electronic message to the selected archive server.

6. The method of claim 1, wherein archiving each group of related electronic messages as a corresponding unified archive item comprises:
receiving a set of grouped journal parts corresponding to a group of the related electronic messages; and
archiving the grouped journal parts as the unified archive item.

7. The method of claim 6, wherein the grouped journal parts comprise a journal report.

8. The method of claim 1, wherein the archiving system comprises a Simple Mail Transfer Protocol (SMTP) mail archiving system.

9. A system for efficient archiving of related electronic messages, the system comprising:
a reception module, stored in memory, that receives a corpus of electronic messages from one or more servers, wherein at least a portion of the electronic messages in the corpus represent electronic messages that are related to each other;
a processing module, stored in memory, that processes the corpus of electronic messages into groups of related electronic messages, wherein each group of the related electronic messages is associated with a message identifier and wherein the processing module processes the corpus of electronic messages by:
identifying the electronic messages in the corpus as journal parts based on the message identifier;
designating the journal parts for grouping;
grouping the journal parts for archiving after a configurable time period has elapsed;
iterating through each of a plurality of entries in a cache of message identifiers to check, in a count of contiguous folders, receipt of a related journal part associated with the message identifiers over a configurable threshold period; and
determining that the grouped journal parts are eligible for archiving when the configurable threshold period has been exceeded without receiving the related journal part;
an archiving module, stored in memory, that archives each group of related electronic messages as a corresponding unified archive item; and
at least one physical processor that executes the reception module, the processing module, and the archiving module.

10. The system of claim 9, wherein the reception module receives the corpus of electronic messages by:
receiving the corpus of electronic messages in a load balancer of the archiving system; and
presorting the corpus of electronic messages to ensure that each group of the related electronic messages is sent to a designated archive server.

11. The system of claim 10, wherein the reception module presorts the corpus of electronic messages by:
determining that a message identifier for an electronic message in the corpus already exists in a load balancer storage;

identifying a designated archive server associated with the message identifier in the load balancer storage;

updating a storage entry associated with the message identifier in the load balancer storage with a timestamp; and sending the electronic message to the designated archive server.

12. The system of claim 10, wherein the reception module presorts the corpus of electronic messages by:

determining that a message identifier for an electronic message in the corpus does not exist in a load balancer storage;

selecting an archive server in the message archiving system;

creating a storage entry in the load balancer storage for the electronic message, the storage entry comprising the message identifier, the selected archive server, and a timestamp; and sending the electronic message to the selected archive server.

13. The system of claim 10, wherein the reception module presorts the corpus of electronic messages by:

determining that a message identifier does not exist for an electronic message in the corpus;

selecting, by the load balancer, an archive server; and sending the electronic message to the selected archive server.

14. The system of claim 10, wherein the archiving module archives each group of related electronic messages as a corresponding unified archive item by:

receiving a set of grouped journal parts corresponding to a group of the related electronic messages; and archiving the grouped journal parts as the unified archive item.

15. The system of claim 14, wherein the grouped journal parts comprise a journal report.

16. A non-transitory computer-readable medium comprising one or more computer-executable instructions that, when executed by at least one physical processor of a computing device, cause the computing device to:

receive a corpus of electronic messages from one or more servers, wherein at least a portion of the electronic messages in the corpus represent electronic messages that are related to each other;

process the corpus of electronic messages into groups of related electronic messages, wherein each group of the related electronic messages is associated with a message identifier and wherein the corpus of electronic messages is processed by:

identifying the electronic messages in the corpus as journal parts based on the message identifier;

designating the journal parts for grouping;

grouping the journal parts for archiving after a configurable time period has elapsed;

iterating through each of a plurality of entries in a cache of message identifiers to check, in a count of contiguous folders, receipt of a related journal part associated with the message identifiers over a configurable threshold period; and determining that the grouped journal parts are eligible for archiving when the configurable threshold period has been exceeded without receiving the related journal part; and archive each group of related electronic messages as a corresponding unified archive item.

17. The non-transitory computer readable medium of claim 16, wherein the one or more computer-executable instructions cause the computing device to archive each group of related electronic messages as a corresponding unified archive item by:

receiving a set of grouped journal parts corresponding to a group of the related electronic messages; and archiving the grouped journal parts as the unified archive item.

18. The computer-implemented method of claim 1, wherein determining that the configurable threshold period has been exceeded comprises checking that a count of contiguous folders for storing the electronic messages and that are viewable without encountering a journal part for the message identifier exceeds the configurable threshold period.

19. The system of claim 9, wherein the processing module determines that the configurable threshold period has been exceeded by checking that a count of contiguous folders for storing the electronic messages and that are viewable without encountering a journal part for the message identifier exceeds the configurable threshold period.

20. The non-transitory computer readable medium of claim 16, wherein the one or more computer-executable instructions cause the computing device to determine that the configurable threshold period has been exceeded by checking that a count of contiguous folders for storing the electronic messages and that are viewable without encountering a journal part for the message identifier exceeds the configurable threshold period.

* * * * *